3,076,763
CALCIUM ALKENYL SUCCINATE GREASE
John W. Nelson, Lansing, Ill., assignor, by mesne assignments, to Sinclair Research Inc., New York, N.Y., a corporation of Delaware
No Drawing. Filed Apr. 28, 1958, Ser. No. 731,093
2 Claims. (Cl. 252—39)

This invention relates to lubricating greases and their manufacture. More particularly, the invention relates to a novel process for producing greases containing as the essential thickening component a calcium soap of an alkenyl substituted succinic acid having 8 to 39 carbon atoms.

Many commercial greases use the lithium or calcium soap of castor oil or 12-hydroxy stearic acid as the essential thickening component. The starting organic materials for these greases are expensive and may become in short supply. Alkenyl succinic anhydrides cost one-half as much as these materials and are made by treating a monoolefin with maleic anhydride, both of which are derived in plentiful supply from petroleum.

As disclosed in U.S. Patent No. 2,528,373, previous attempts to make a grease containing the calcium soap of $C_{10}$ to $C_{12}$ alkenyl succinic acids as the essential thickening agent have failed. Copending application Serial No. 642,336, filed February 26, 1957, now U.S. Patent No. 2,868,729, shows that greases having valuable lubricating properties can be made with such soaps when the alkenyl side-chain contains at least 14 carbon atoms.

A method has now been discovered by which lubricating greases, comparable in their properties to those made from naturally occurring fats and fatty acids, can be produced from alkenyl succinic acid. The process employs an acid component, a calcium component, water, and an oil component. In the process the acid component, mixed with oil and water, is neutralized at room temperature or slightly above with about half the amount of calcium component needed for complete neutralization. Free water is evaporated from this mixture by heating. Then more water, oil and the remaining stoichiometric amount of calcium component are added to the mixture at room temperature or slightly above until soap formation is complete. The mixture is once more heated to evaporate free water, and is then heated still further, to at least about 300° F. to remove a substantial quantity of combined water. After this, any further oil component needed is added to bring the grease to a soap content of about 2.5 to 50 percent.

INGREDIENTS

The acid component is an alkenyl succinic acid or anhydride containing 8 to 39 carbon atoms in the whole molecule, preferably between 14 and 25 carbon atoms. The alkenyl substituted acids can be obtained by conventional procedures such as condensing maleic anhydride with an aliphatic olefin having between 4 and 35 carbon atoms. The condensation is carried out by heating the anhydride and the olefin with stirring for several hours preferably at reflux temperatures under slight pressure. The total condensation product can be employed in the grease-making reaction or the total product can be fractionated or recrystallized to remove lighter materials, for example, for recycle. The substituted succinic anhydride produced or its acid can be mixed with other organic acids or anhydrides in minor amounts to modify the final properties of the grease.

The olefin having at least 14 carbon atoms can be straight chain or branched. Preferably the olefin is obtained as the bottoms fraction from propylene polymer production, e.g. the propylene tetramer, although it can be derived from various sources including propylene and butylene homo- and hetero-polymers. The olefin can be substituted or unsubstituted but if substituted, the substituent should be non-reactive. The olefin can have more than one olefinic linkage but preferably has only one. The olefinic linkage can be at the terminal position or towards the middle of the molecule such as in 17-pentatriacontene and 11-tricosene. For instance, when the olefin is 1-octadecene the reaction product has a normal side chain with the olefin being in the beta-position with respect to an alpha-carbon atom of the succinic acid or anhydride. In the case of the olefins 17-pentatriacontene and 11-tricosene, the double bond is in a similar position and the chains attached to the carbon atoms of the double bond contain 16 and 17 carbon atoms, respectively, in the case of 17-pentatriacontene and 10 and 11 carbon atoms, respectively, in the case of 11-tricosene. These carbon chains are normal in structure. When the olefin is a propylene polymer which has the double bond in a position other than terminal, the carbon chains attached to the main succinic acid or anhydride structure have multiple branched chains.

The oil component is a liquid oleaginous base material of lubricating viscosity. It may be a mineral lubricating oil fraction of the conventionally refined or solvent refined type. The mineral lubricating oil fraction can be derived from a paraffinic, naphthenic or Mid-Continent crude and is of lubricating viscosity, e.g. from about 50 SUS at 100° F. to 200 SUS at 210° F. Although the use of high viscosity oils (above 100 SUS at 100° F.) gives harder greases, the use of a low viscosity non-naphthenic 100 percent solvent refined neutral Mid-Continent base lubricating oil provides a grease having better low temperature pumpability. The greases also have been made using a blend of naphthenic and solvent refined Mid-Continent lubricating oil bases.

In addition to the distillate mineral lubricating oils mentioned, the various types of synthetic liquid oleaginous lubricating bases having comparable viscosities can also be employed as part or all of the lubricating base with these particular soaps. Among the types of synthetic liquid oleaginous lubricating bases which can be employed are the oil-soluble high boiling high molecular weight aliphatic ethers, aromatic esters, aliphatic mono- and dicarboxylic esters, phosphorus acid esters and halogenated aromatic compounds which possess lubricating properties and also have small change in viscosity for a given change in temperature. Of the various synthetic oleaginous compounds specified, those falling within the category of aliphatic dicarboxylic acid esters, and particularly the branched chain aliphatic esters, such as di-2-ethylhexyl sebacate, are preferred. Throughout this specification and in the claims, the expressions "oil component" and "liquid oleaginous lubricating base" are employed to designate both the mineral lubricating oils and the synthetic lubricating bases specified.

The calcium component is a slurry or solution in water or the oil component, of lime, calcium hydroxide or other at least somewhat water-soluble inorganic calcium compound. As mentioned above, a total amount of calcium compound is used which is sufficient to neutralize essentially all of the acid component. An amount of calcium component of slightly more than stoichiometric quantities will insure complete neutralization.

A quantity of water is used which is at least twice the weight of the acid component. The water may be in excess of this amount and may be as plentiful as economic considerations permit. Better results seem to be obtained when more water is used. Enough of the oil component is used to give a grease containing 2.5 to 50 percent by weight of soap, preferably 7.5 to 25 percent, with enough soap being present to give a product of grease consistency.

COMBINING INGREDIENTS

The neutralization temperature is never above about 130° F. The initial neutralization is performed, preferably at room temperature up to about 130° F. by mixing the acid component together with some or all of the water and oil and about 40 to 60 percent, preferably about 50 percent, of the calcium component. The oil content of the mixture during this first neutralization must be at least about two and preferably at least about three times the weight of the acid component. The water present during this neutralization must weigh as much or more than the acid component. The mixture is stirred, and heat may be applied, but the mixture should be kept below about 130° F. This first neutralization is usually complete in 15 to 20 minutes, as evidenced by gelation and the appearance of free water in the mass.

Premium grease compositions characteristically are substantially anhydrous; i.e., the finished greases have a water content below about 0.5 weight percent. Therefore, when the first neutralization is complete, the mixture is heated to as high as about 250° F. to evaporate free water from the mass. The completion of evaporation is evidenced by the discontinuation of bubble formation in the mass. However, if desired, the mixture may be dehydrated at this point by heating it to a temperature of 340° F. After evaporation or evaporation and dehydration, the mixture is cooled to below about 130° F. or even to ambient temperature.

When cooled to the proper temperature, the remaining quantities of the ingredients are added: the remaining quantity of the calcium compound needed for complete neutralization of the acid; some or all of the oil needed to give the required percentage of soap in the final grease composition, if all of the oil was not used from the start; and another quantity of water weighing at least as much as the acid component. Once more, the quantity of water can be greatly in excess of this amount. The total quantity of water used in each neutralization should equal or exceed 5 moles of water for each mole of acid component.

The completion of this second neutralization is signaled by the formation of more gel in the mixture. The mixture is then brought to an elevated temperature to dry the mixture by removal of free water. Most of the water is removed below about 250° F., but the combination of a little water with some of the components of the grease requires the use of a higher temperature for dehydration. This temperature may be from about 300° F. to as high as about 450° F. but no particular advantage is associated with temperatures higher than about 400° F. In actual practice a temperature range between about 325° and 360° F. has been found satisfactory to dehydrate most greases and this temperature range is preferred. The end of the dehydration step is shown by a stop in the production of bubbles at the surface of the grease.

After completion of the dehydration the remaining amount of the oil, if any, may be added, and it is advantageous to mill the grease to the desired consistency. This can be performed in any type of homogenizer or mill.

Materials normally incorporated in greases to impart special characteristics can be added to the compositions. These include oxidation inhibitors, corrosion inhibitors, extreme pressure agents, anti-wear agents, etc. The amount of additives added to the grease compositions usually ranges from about 0.01 weight percent up to about 10 weight percent, and in general, can be employed in any amounts desired so long as the grease composition is not unduly deleteriously affected.

The following examples illustrate but do not limit the invention.

*Example I*

At room temperature in a grease kettle, 0.17 pounds of lime slurried in 4.25 pounds of starting oil were added to 1.0 pound of tetrapropenyl succinic anhydride (Monsanto) and 2 pounds of water. While stirring, steam was introduced into the jacket of the kettle and then turned off, keeping the contents below 130° F. After 10 minutes the soap base formed and free water was evident. After 5 minutes heat was again applied and the kettle contents brought to 230° F. and maintained at or below 230° F. for the next 4.25 hours. The kettle was then turned off for the night allowing the contents to cool to ambient temperature. The next morning, 0.17 pound of lime slurried in 2 pounds of water were added to the kettle at room temperature, the stirrer turned on and heat applied. During the next 30 minutes at a temperature at or below 130° F., a heavy soap base was formed. 0.05 pound of dry lime, to make the mass basic, and sufficient finishing oil to make the soap content 16 percent, were added. Over the next 4.25 hours the temperature was raised to 240° F. Then 125 pounds of steam pressure was introduced into the jacket of the kettle and maintained for 1.25 hours. The maximum temperature obtained was 340° F. The kettle contents were then cooled by turning off the steam and introducing cooling water into the jacket. The grease was then milled at 0.003 inch clearance and at 125° F., in a Charlotte colloid mill. The properties of this grease are reported in Table I.

*Example II*

In a grease kettle, 156 grams of lime slurried in one quart of water were added to two pounds of tetrapropenyl succinic anhydride (Monsanto) and 6 pounds of oil and the agitator started. Steam was introduced into the kettle jacket and then turned off to keep the temperature below 130° F. After 15 minutes a soap base and free water had formed and heat was again applied. After 15 minutes the free water has disappeared. Heating and stirring were continued for 5 hours during which time the temperature had reached 236° F. The kettle was then shut down for the night. The next morning, 156 grams of lime slurried in 2 pounds of water were added to the kettle at 78° F., the stirrer turned on and 10 pounds steam pressure introduced into the kettle jacket. A hard soap formed almost immediately at a temperature below 130° F. Three pounds of oil were added, to make the soap content 18.2 percent. Increased heat was applied gradually, 10 to 15 to 40 to 65 pounds steam pressure over the next hour. The 125 pounds of steam pressure was introduced to the jacket for the next 4.5 hours. A temperature of 346° F. was obtained. The grease was then cooled and milled as in the batch of Example I.

*Example III*

To 300 grams of tetrapropenyl succinic anhydride (Monsanto) mixed with 600 grams 300 SUS at 100° F. naphthenic oil at room temperature, 55 grams lime slurried in 300 cc. H₂O were added. Low heat was applied to the kettle. After 20 minutes below 130° F., a heavy gel had formed and free water was evident. Forty-five minutes later and at 170° F. a very heavy soap had formed and 300 grams more oil were added. After stirring an additional 10 minutes and at 180° F. the kettle was turned off for the night. The following morning agitation was started and heat applied to the kettle. After 5 hours and at a temperature of 244° F. 30 grams of maleic anhydride were added to the kettle and the contents cooled to 120° F. Then 70 grams of lime slurried in 330 cc. water were added. The soap which formed became very stiff and 600 grams more oil were added to make the soap concentration 18 percent. Heating and stirring were continued for the next 2 hours and 3 grams of dry lime were added to make the mass basic. The kettle contents were stirred and heated for the next 4.25 hours at a maximum temperature of 340° F. to remove free and combined water and then turned off for the night, after allowing to cool while stirring for 45 minutes. The next day the grease was milled in a Charlotte colloid mill set at 0.005" clearance at room temperature.

*Example IV*

The criticality of having an amount of water at least equal in weight to the acid component during each neutralization is shown by the following example wherein neutralization was performed in the presence of water which weighed only one-third as much as the acid component. Tests on this grease showed an unworked penetration of 347, worked penetration of 380, and 383 after 100 M strokes dry. After 100 M strokes wet (with 10 percent water), it became a soup (420+ penetration). It failed the 250° F. wheel bearing test and had a 15.9 percent MIL–G–10924A bleed test. Boiling water tests were good and it had a 500+° F. dropping point. This batch was prepared as follows:

To 300 grams of tetrapropenyl succinic anhydride (Monsanto) 55 grams lime slurried in 900 grams of 63 SUS at 100° F. viscosity solvent refined Mid-Continent oil and 100 cc. water were added at 78° F. Heat was applied gradually. The neutralization was completed before the temperature reached 130° F. After 30 minutes the temperature was 176° F. After two hours and a maximum temperature of 318° F. heating was discontinued. Thirty minutes later, at 272° F., the kettle was turned off for the night. The next morning with the kettle contents at 78° F., 55 grams of lime slurried in 600 grams of the same oil and 100 cc. $H_2O$ were added and heat was applied to the kettle. After the neutralization was completed below 130° F., the mixture was heated for 3 hours and attained a maximum temperature of 356° F. The contents were then stirred and cooled to room temperature and milled as in the previous examples.

In Table I these greases are compared with each other and with a multipurpose lithium 12-hydroxy stearate thickened grease having good properties.

(A) An alkenyl succinic acid component containing 8 to 39 carbon atoms
(B) enough to neutralize the acid component of a calcium component comprising a slurry, in a medium selected from the group consisting of water and the oil component described below, of an inorganic calcium compound
(C) an amount of water weighing at least twice as much as the acid component
(D) enough to give a grease containing 2.5 to 50 percent, by weight of soap, of an oil component which is an oleaginous liquid lubricating base, the steps of
(1) mixing, at ambient temperature to about 130° F., the acid component, about half the calcium component, a quantity of the oil component weighing at least three times as much as the acid component and a quantity of water weighing at least the weight of the acid component, until soap formation occurs;
(2) heating the mixture at a temperature up to about 250° F. to evaporate free water and cooling the mixture to below about 130° F.;
(3) adding the remaining calcium component and quantity of water weighing at least as much as the acid component while stirring at ambient temperature to about 130° F. until soap formation is essentially complete;
(4) heating the resulting mixture to between about 300° F. and 450° F. to remove combined water; and
(5) adding any remaining oil to obtain a product of grease consistency.

2. In a process for making a lubricating grease from the ingredients:
(A) tetrapropenyl succinic acid
(B) enough to neutralize the acid of a calcium com-

TABLE I

| Grease of Example | I | II | III | IV | Lithium 12-OH Stearate Grease |
|---|---|---|---|---|---|
| Weight of acid or anhydride (g.) | 454 | 907 | 330 | 300 | |
| Weight of lime (g.) | 167.1 | 312 | 128 | 110 | |
| Weight of 1st $H_2O$ Addition (g.) | 907 | 946 | 300 | 100 | |
| Total water (g.) | 1,814 | 1,853 | 600 | 200 | |
| Moles $H_2O$ per mole acid | 57.6 | 30.8 | 28.8 | 9.65 | |
| Mineral oil: | | | | | |
| Viscosity, SUS at 100° F | 63 | 300 | 300 | 63 | |
| Type | Mid-Cont | Naph | Naph | Mid-Cont | |
| Amount of 1st addition (g.) | 1,930 | 2,722 | 600 | 900 | |
| Total amount | 2,384 | 4,082 | 1,500 | 1,500 | |
| Percent soap in grease | 16 | 18.2 | 18 | 16.7 | |
| Maximum temperature, °F | 340 | 346 | 340 | | |
| Penetration: | | | | | |
| Unworked | 240 | 273 | 292 | 347 | 280. |
| 60 Strokes | 298 | 325 | 326 | 380 | 280. |
| 100 M strokes | 320 | 326 | 313 | 383 | 300. |
| 100 M strokes (wet 10% $H_2O$) | 282 | | | 420+ (Soup) | |
| Dropping point, °F | 500+ | 500+ | 500+ | 500+ | 375. |
| 250° F. wheel bearing test | Fair | Good | Good | Failed | Good. |
| Boiling water test | Good | Good | Very Good | Good | Do. |
| Excess base, percent | 0.9 | 0.3 | 0.4 | 0.6 | 0.05. |
| Moisture | | 0.2 | Trace | 0.6 | 0.1. |
| MIL-G-10924A bleed, percent | 2.7 | 0.1 | | 15.9 | 5–6. |

It can be readily seen that calcium alkenyl succinate greases can be prepared, using the process of this invention, that consistently have superior properties, so that alkenyl succinic acids or anhydrides may serve as a substitute for hydrogenated castor oil and 12-hydroxy stearic acid in the compounding of lubricating grease compositions. The process of the invention makes possible a lower cost premium multipurpose grease equal or superior to lithium greases with respect to bleeding, dropping point, work and water stability, and extreme pressure properties.

I claim:
1. In a process for making a lubricating grease from the ingredients ponent comprising a slurry, in a medium selected from the group consisting of water and the oil component described below, of an inorganic calcium compound
(C) an amount of water weighing at least twice as much as the acid component
(D) enough to give a grease containing 2.5 to 50 percent by weight of soap of an oil component which is an oleaginous liquid lubricating base, the steps of
(1) mixing, at ambient temperature to about 130° F., the acid, about half the calcium component, a quantity of the oil component weighing at least three times as much as the acid and a quantity of water weighing at least the weight of the acid, until soap formation occurs;

(2) heating the mixture at a temperature up to about 250° F. to evaporate free water and cooling the mixture to below about 130° F.;

(3) adding the remaining calcium component and a quantity of water weighing at least as much as the acid while stirring at ambient temperatures to about 130° F. until soap formation is essentially complete;

(4) heating the resulting mixture to between about 300° F. and 450° F. to remove combined water; and (5) adding any remaining oil to obtain a product of grease consistency.

References Cited in the file of this patent

UNITED STATES PATENTS

| | | |
|---|---|---|
| 2,528,373 | Knowles et al. | Oct. 31, 1950 |
| 2,698,297 | Giammaria | Dec. 28, 1954 |
| 2,698,298 | Giammaria | Dec. 28, 1954 |
| 2,698,299 | Giammaria | Dec. 28, 1954 |
| 2,868,729 | Nelson et al. | Jan. 13, 1959 |